United States Patent
Dunn et al.

(10) Patent No.: US 8,261,210 B2
(45) Date of Patent: *Sep. 4, 2012

(54) TV WIDGET ANIMATION WITH AUDIO

(75) Inventors: Ted Dunn, Carlsbad, CA (US); Tracy Ho, San Diego, CA (US); Yuko Nishikawa, La Jolla, CA (US); Hiroki Sugimoto, San Diego, CA (US); Steven Friedlander, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 825 days.

This patent is subject to a terminal disclaimer.

(21) Appl. No.: 12/384,313

(22) Filed: Apr. 2, 2009

(65) Prior Publication Data

US 2010/0257555 A1 Oct. 7, 2010

(51) Int. Cl.
*G06F 3/00* (2006.01)
(52) U.S. Cl. ........ 715/849; 715/716; 715/718; 715/740; 715/850
(58) Field of Classification Search .................. 715/849, 715/716, 718, 740, 850
See application file for complete search history.

(56) References Cited

U.S. PATENT DOCUMENTS

| | | | |
|---|---|---|---|
| 6,731,314 | B1 | 5/2004 | Cheng et al. |
| 2003/0142092 | A1 | 7/2003 | Fitzmaurice et al. |
| 2006/0101341 | A1 | 5/2006 | Kelly et al. |
| 2007/0061724 | A1 | 3/2007 | Slothouber et al. |
| 2007/0120846 | A1 | 5/2007 | Ok et al. |
| 2008/0046945 | A1 | 2/2008 | Hanley |
| 2008/0155414 | A1 | 6/2008 | Matsuo |
| 2008/0168382 | A1* | 7/2008 | Louch et al. .................. 715/781 |
| 2008/0195961 | A1 | 8/2008 | Bae et al. |
| 2008/0235602 | A1 | 9/2008 | Strauss et al. |
| 2009/0024944 | A1 | 1/2009 | Louch et al. |

(Continued)

FOREIGN PATENT DOCUMENTS

JP 2008-282392 11/2008

(Continued)

OTHER PUBLICATIONS

International Search Report and Written Opinion, PCT/US2010/028678, (Corresponds to related U.S. Appl. No. 12/384,311), dated Nov. 11, 2010.
First Non-Final Office Action, related U.S. Appl. No. 12/384,311 dated Jun. 23, 2011.

(Continued)

*Primary Examiner* — William Bashore
*Assistant Examiner* — Mylinh Tran
(74) *Attorney, Agent, or Firm* — Miller Patent Services; Jerry A. Miller

(57) ABSTRACT

An example television Widget movement method involves receiving a dedicated command from a remote controller that activates the plurality of Widget programs, when in Display mode, display Widget representations on a display; receiving a command that establishes one of the plurality of displayed Widget programs as the Widget program that is currently in focus; and receiving a command that places the Widget program currently in focus in Move Mode. The Widget can be moved about the display while in Move Mode, where when the Widget is in Move Mode, the Widget representation is responsive to navigation commands to move about the display. Such movement is animated using a 3 dimensional graphics engine and accompanied by an audio sound effect. This abstract is not to be considered limiting, since other embodiments may deviate from the features described in this abstract.

15 Claims, 12 Drawing Sheets

U.S. PATENT DOCUMENTS

| | | | |
|---|---|---|---|
| 2009/0158193 | A1 | 6/2009 | Chaudhri et al. |
| 2010/0011394 | A1 | 1/2010 | Lee et al. |
| 2010/0115471 | A1* | 5/2010 | Louch et al. ............... 715/849 |
| 2010/0222102 | A1 | 9/2010 | Rodriguez |
| 2011/0167453 | A1* | 7/2011 | Moreau et al. ............... 725/44 |

FOREIGN PATENT DOCUMENTS

| | | |
|---|---|---|
| KR | 10-0747663 | 8/2007 |
| WO | WO 2007/061827 A2 | 5/2007 |
| WO | WO 2008/082441 A1 | 7/2008 |

OTHER PUBLICATIONS

"My Coke Rewards Widget," Yahoo Widgets, 4 Browser, 2008.

"Sina Hong Kong revamps with broader customisation tools," Brand Republic Asia, Digital Media, May 29, 2008.

"How to use the mouse to move widgets in a Layout container," Ruby-Gnome2 project, 2006.

"Majority Desk—Milmote 3D widget desktop," Michael Cote, PodTech, Oct. 3, 2007.

"Three-Dimensional Widgets," D. Brookshire Conner et al, 1992.

* cited by examiner

TV WIDGET ANIMATION WITH AUDIO

CROSS REFERENCE TO RELATED DOCUMENTS

This application is related to Ser. No. 12/384,312 entitled "TV Widget Animation" to Friedlander et al. and Ser. No. 12/384,311 entitled "TV Widget Multiview Content Organization" to Friedlander et al. all filed of even date herewith and which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Television sets are evolving into a home entertainment appliance that has increasing capabilities. However, in order to preserve the traditional operational paradigm of a television set, most control of a television is still carried out using a remote controller device. This can limit the user's ability to comfortable utilize the television set in less conventional manners.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 3:
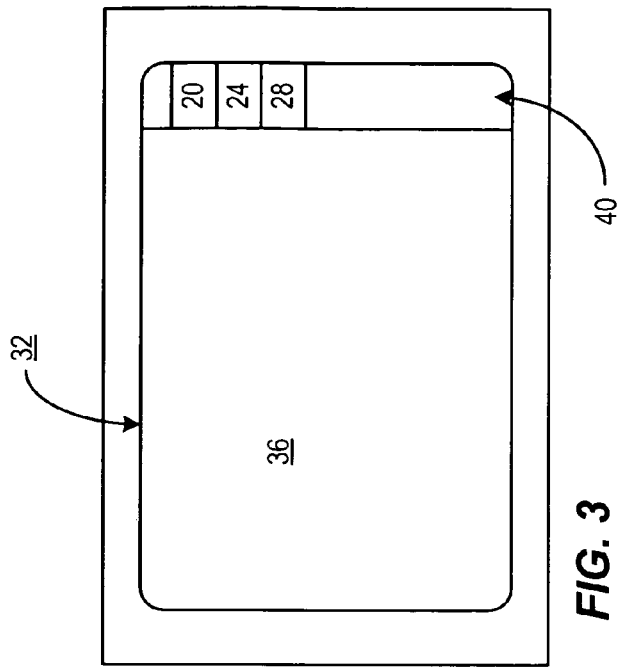
FIG. 3 is an example simulated screen shot depicting a docked arrangement of Widgets or Snippets in a split screen arrangement in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "focus" is used to mean an item on the television display which has been identified (e.g., highlighted) but may or may not have yet been actually selected for a particular operation.

For purposes of this document a Widget (or gadget) is a software application program that can be displayed, usually in a small window, of the television screen. Generally, such Widgets carry out simple but useful or entertaining functions. Examples would include applications that retrieve weather data, time, or carry out other simple functions. A Snippet is an instance of a Widget or a child of a Widget. Fully interactive gadgets will often have options that will allow the user to save an instance of the Widget. For example, if the user is interacting with a Weather Widget, they can save a Tokyo weather snippet, and a San Diego weather snippet. Snippets will all have the ability to expand into the panel version of the parent gadget. In the present discussion, the terms are to be considered synonymous and interchangeable since actions on a Widget are equally applicable to a Snippet. In the present discussion, the terms Widget and Snippet can also be used to mean the video representation presented when a Widget or Snippet (i.e., a Widget representation) is displayed on a display screen, and the use of the term should be clear from the context, wherein, generally discussion of display and animation and movement of the Widget and Snippet will refer to the video representation of the Widget or Snippet.

The term "multi-view" as used herein relates to having multiple Widgets sharing the screen with a more conventional television (TV) input. This state allows TV users to access and control multiple Widgets with the remote controller (RC) without accessing the content presiding in the Widgets. This is akin to how the PC presents web pages in a browser. Much the same as a browser, users can move, close, or organize GUI windows on the desktop without purposing the website functions. However, in a television environment interaction with Widgets a constrained by the paradigm of a more or less conventional television user interface (UI)—i.e., generally using a remote controller. The device is in Multi-View when there is a primary input window and secondary window are active simultaneously. Multi-view will allow the user to move focus between all windows, including primary and secondary. This document describes navigation methods and organization methods for Widgets presented in multi-view as well as animation and audio functions associated with Widget movement.

Thus, multi-view, as explained above, allows for having multiple applications or Widgets running independently and available to the user over or next to a TV inputs video plane in a television environment. Multi-View may include inputs, Widgets, web applications, or a combination of these.

Figure 1:
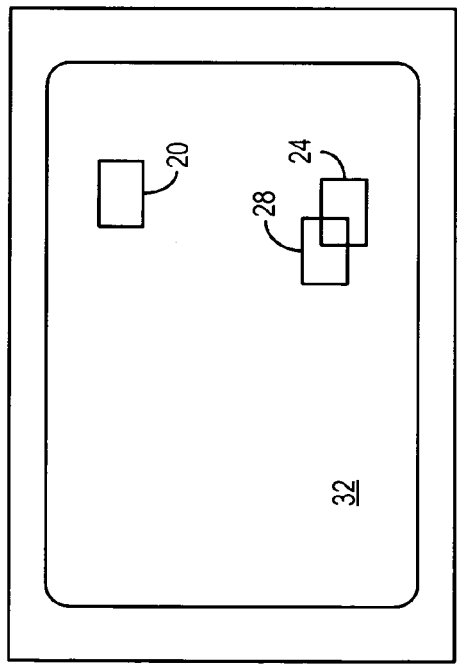
FIG. 1 is an example simulated screen shot depicting free space arrangement of Widgets or Snippets in a manner consistent with certain embodiments of the present invention.

Multi-View can be presented in a few different ways. One way is referred to as free-space and is depicted in FIG. 1. Free space allows the user to place multi-view items such as Widgets 20, 24 and 28 for example, anywhere on the visible screen 32. In free-space users can move Widgets around the screen using up down left and right.

Figure 2:
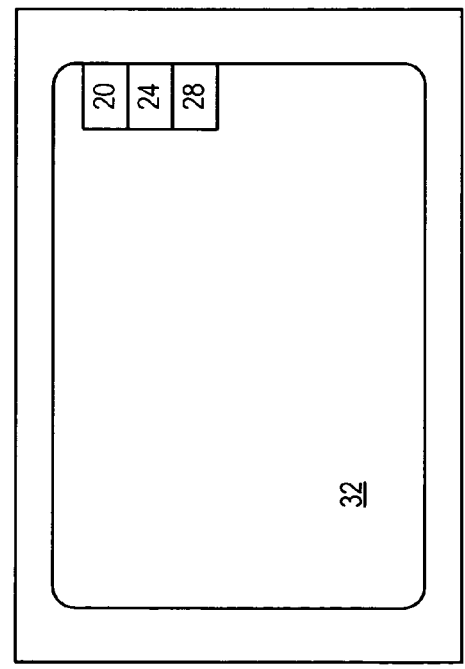
FIG. 2 is an example simulated screen shot depicting a docked arrangement of Widgets or Snippets that overlays the main television content in a manner consistent with certain embodiments of the present invention.

Another version of multi-view is a docked view as depicted in FIG. 2. Docked view is a preset organization of the available Widgets (such as aligned right). The TV dock aligns all the items that appear on the screen in a vertical list arrangement. Docked view can be presented in at least two ways: Split screen as shown in FIG. 3 with the primary input window 36 to the left (or right) of the Widgets or Widgets in a dock on top of the primary input window as an overlay (which may be transparent) as depicted in FIG. 2.

In accord with implementations consistent with the present invention, Multi-View can have two distinct window organization methods, Free Space and Dock as previously depicted. The Dock view can be viewed as either a split screen (Widgets to the right or left of primary input) or on top of the primary input window.

In the Free Space example presented in FIG. 1, it is noted that Widgets can be placed on top of each other (as in the case of 24 and 28) or anywhere on the visible screen. In the case of the Dock split screen example of FIG. 3, Widgets are organized in a vertical menu 40 next to the primary input. In the Dock with no split screen example of FIG. 2, which may be used as a Default view, Widgets are organized in a vertical menu overlaying the primary input.

In general, Widget representations on the display can be in any of three modes. In a Hide Mode the Widget programs are not displayed on a display, but may be actively running in the background or not. In a Display Mode the Widget programs are displayed on the display, wherein navigation commands from the remote controller operate to change focus from one Widget representation on the display to another. In a Move Mode a representation of the Widget program that is currently in focus is responsive to navigation commands from the remote controller to move the Widget about the display. Movement between modes generally progresses from Hide Mode to Display Mode to Move Mode to Display Mode to Hide Mode, but this is not to be considered limiting.

Figure 4:
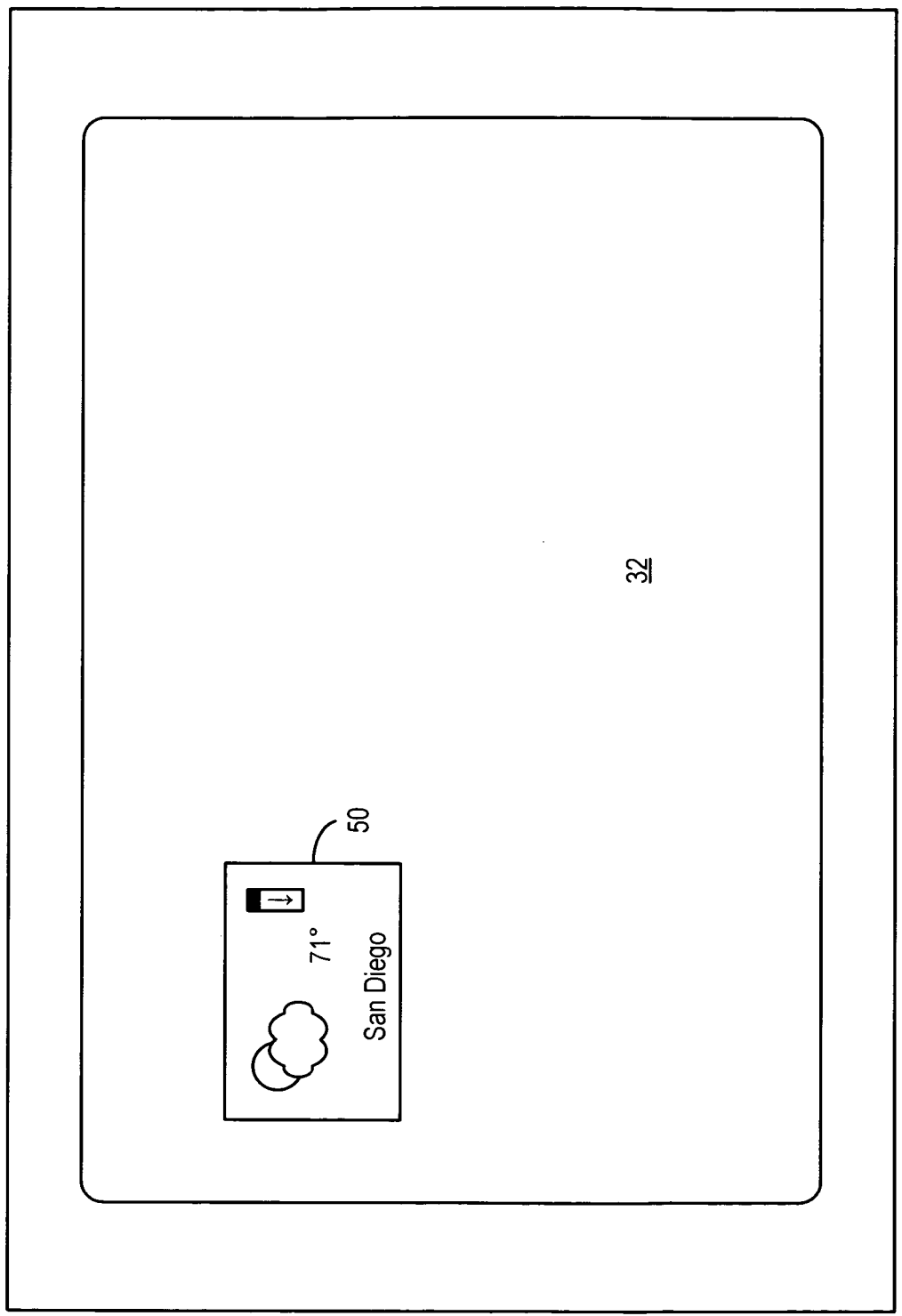
FIG. 4 is an example simulated screen shot depicting free space arrangement of a weather Widget or Snippet that is not in the Move Mode in a manner consistent with certain embodiments of the present invention.

Free Space organization allows the user to move the Widgets anywhere within the visible screen area much like a PC window. The user activates the window to place it in a moveable state, in this state the user is able to direct Widgets or snippet movement around the screen using UP/DOWN/LEFT/RIGHT. This state will be referred to as "Move Mode". In order to focus on the implementation of the Move Mode, consider the example of FIG. 4. In this example, a Weather Widget 50 is used as an illustration. Moving focus in free space is accomplished by use of UP/DOWN/LEFT/RIGHT controls of the remote controller to navigate between multiview items. This section describes the general rules for placing focus on items in free space using the UP/DOWN/LEFT/RIGHT keys. UP/DOWN/LEFT/RIGHT keys move the focus from item to item depending on the relative location of other items to the center of the item in focus. Navigation in multi-view in accord with this example does not wrap. The following illustrations outline some of the expected behavior:
Perfect alignment—If the center points of the Widgets or Snippets align perfectly in either an up, down, left, or right line then only use the key corresponding to the aligned poison to move focus between the items For example if aligned left and right, then only left and right will work.
Offset alignment—If the center points of the Widgets or Snippets not aligned perfectly, then it is possible to use more than one key to move focus over to the next item. So, for example, if two Widgets are offset both vertically and horizontally, the user may choose a vertical key or a horizontal key to change focus.
Closest items—In this case when either RIGHT or DOWN is pressed focus is placed on the Widget whose center point is closest to the one in focus.
Up and left priority—In one example, if there are multiple Widgets or Snippets relative to the Widget or Snippet in focus, the focus priority for two widgets with the same center point distance is to move to the Widget or Snippet that is to the top left.

In examples presented herein, Widgets are shown in multi-view. However, any GUI application, Snippet, etc. can be designed to work in multi-view without departing from implementations consistent with the present invention. For example, in addition to Snippets and Widgets, Internet Video operations, video players, Settings and any media application or GUI application the TV runs can be repurposed to work like a Widget by simple addition of a "Snippet" to the particular application.

Figure 5:
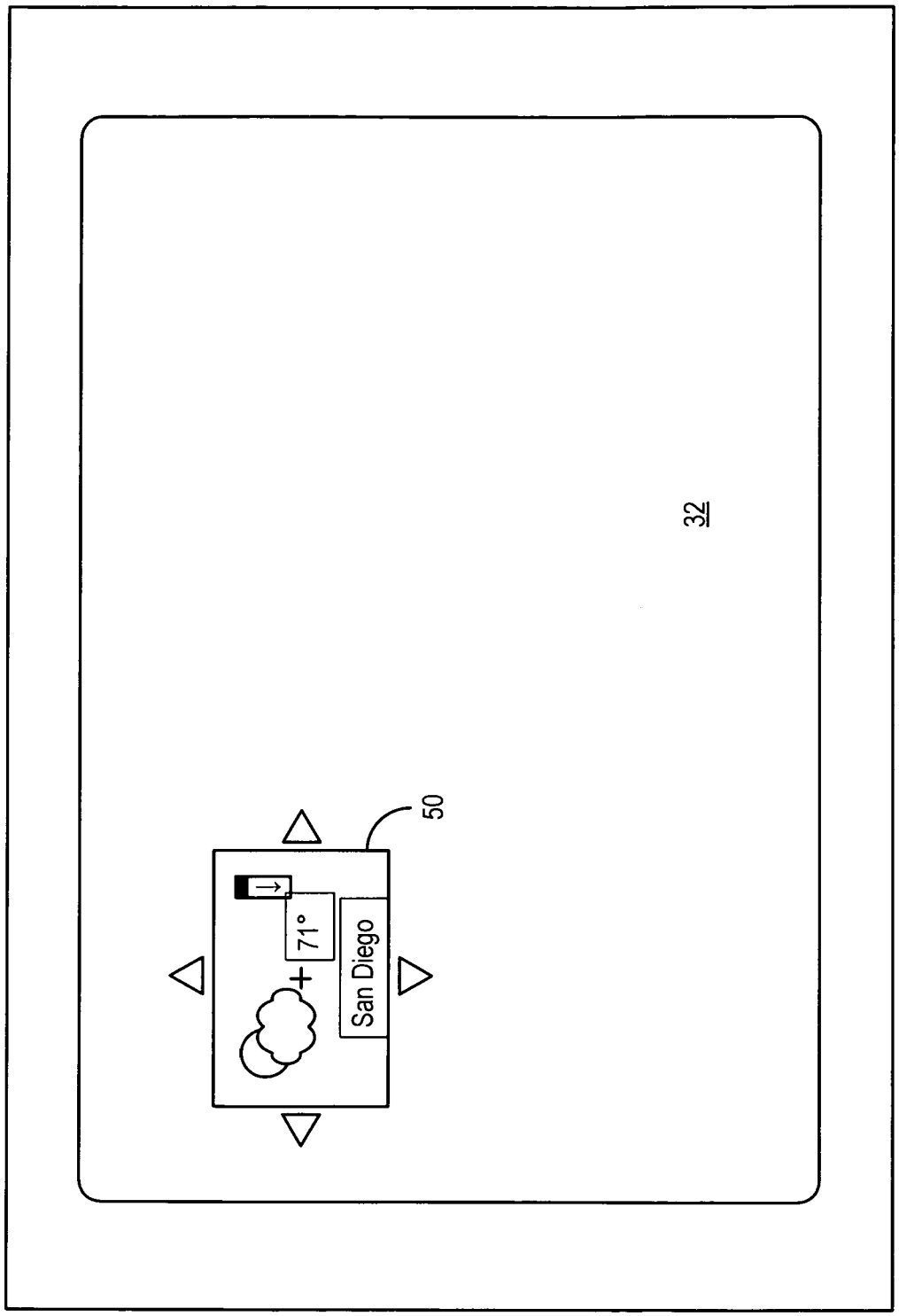
FIG. 5 is an example simulated screen shot depicting free space arrangement of a weather Widget or Snippet that is in the Move Mode in a manner consistent with certain embodiments of the present invention.

Snippets and Widgets are displayed on the screen by pressing a designated remote controller key (e.g., a Widget Key) which toggles display of Widgets on and off. Once an item is in focus, such as 50 (shown win isolation for ease of illustration), the user can move from Widget to Widget as described above. The user can enter Move Mode by, for example, pressing and holding a designated key such as the select key. Upon doing so, the Move Mode is entered as depicted in FIG. 5. Once the Move mode is entered the mode is visually confirmed by a visual indicia such as the appearance of UP, DOWN, LEFT and RIGHT arrows surrounding the Widget in focus. The user can move that Widget when in the Move Mode by use of the UP, DOWN, LEFT and RIGHT keys of the remote controller. The user can enter and depart Move Mode by use of the remote controller. When not in Move Mode, the navigation keys of the remote controller serve to move the focus from one Widget or Snippet representation on the display to another as described above. When in Move Mode, the remote controller navigation keys serve to move the focused Widget about the display.

In accord with certain example implementations, users can move Multi-View items in 3D space. For example Widgets residing in Multi-View can be made to appear to pan and bounce off screen edges (or other screen objects) because they are illustrated in the TV 3D plane. Using 3D presentation technology inherent in the TV Multi-View items can have 3D characteristics. However while in the 3D space the Widgets still need to pull and present network content.

Figure 6:
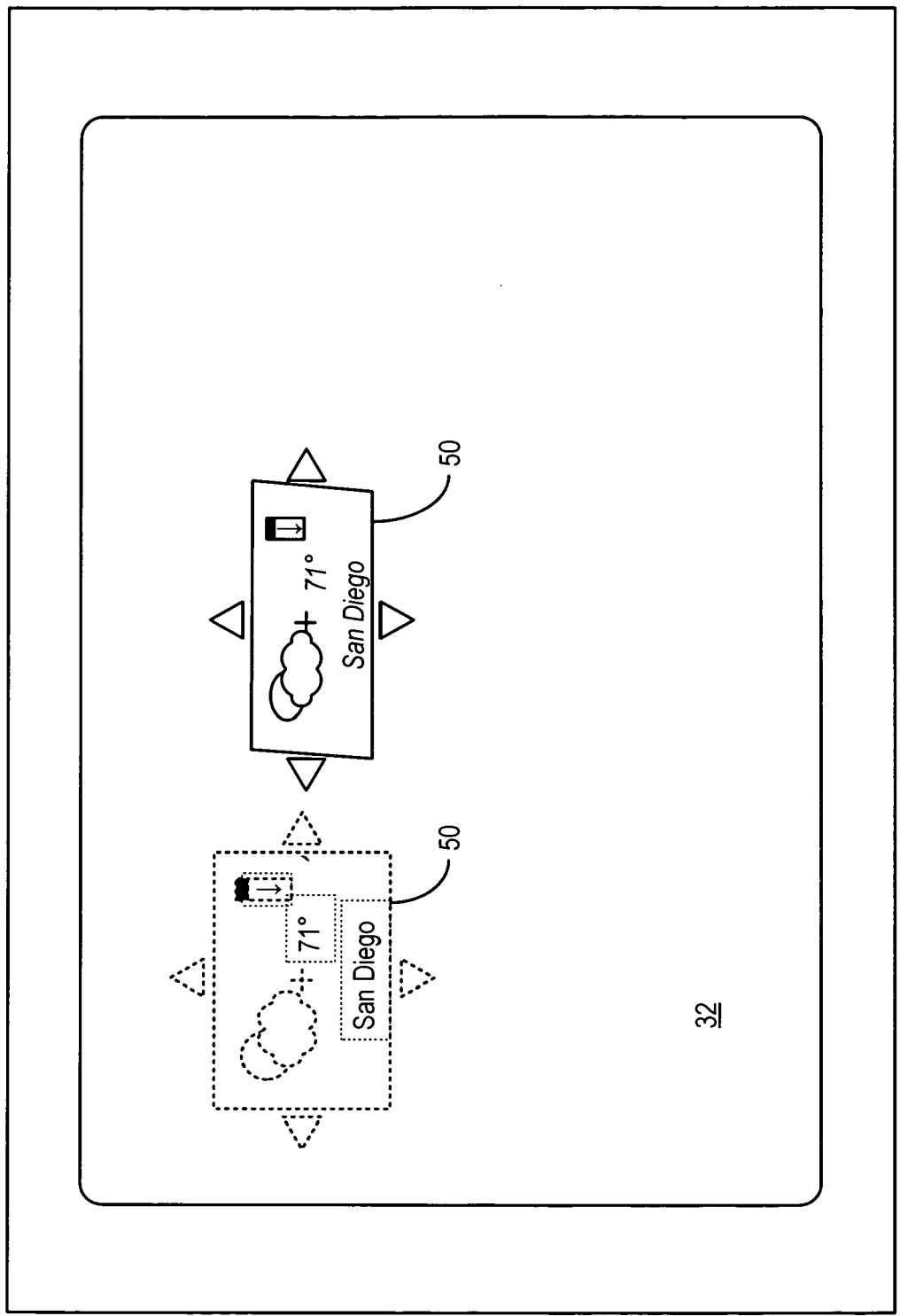
FIG. 6 is an example simulated screen shot depicting free space arrangement of a weather Widget or Snippet that is in the Move Mode and being animated in movement to the right in a manner consistent with certain embodiments of the present invention.

By way of example, assume that the Widget 50 is in focus and in Move Mode as shown in FIG. 5. If the user wishes to move the Widget to the right, he or she presses the RIGHT arrow key of the remote control. The Widget can then be moved either incrementally or by pressing and holding the RIGHT arrow key. Referring to FIG. 6, the Widget can be animated in a manner that depicts movement using 3D graphics rendering and the image of the Widget and the arrows may be given attributes such as throbbing or blurring or the like to indicate movement. Widget 50 is shown on the left in FIG. 6 in dotted lines to depict its prior location and in an animated rendering to its right to depict movement from that original location. When the arrow key is held down, the Widget's movement can be further animated as will be discussed later.

Figure 7:
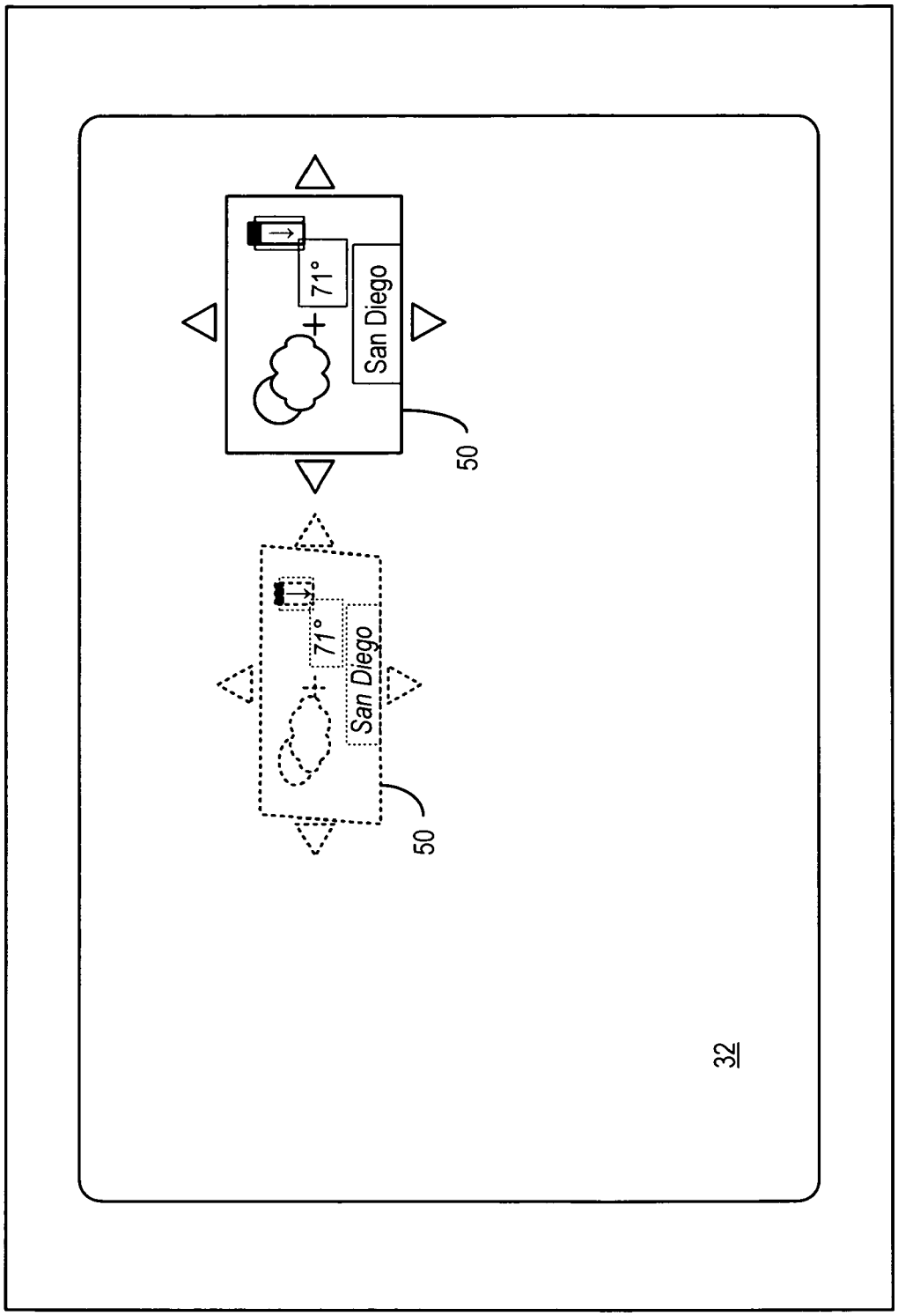
FIG. 7 is an example simulated screen shot depicting free space arrangement of a weather Widget or Snippet that is in the Move Mode and being animated in movement to the right in a manner consistent with certain embodiments of the present invention.
Figure 8:
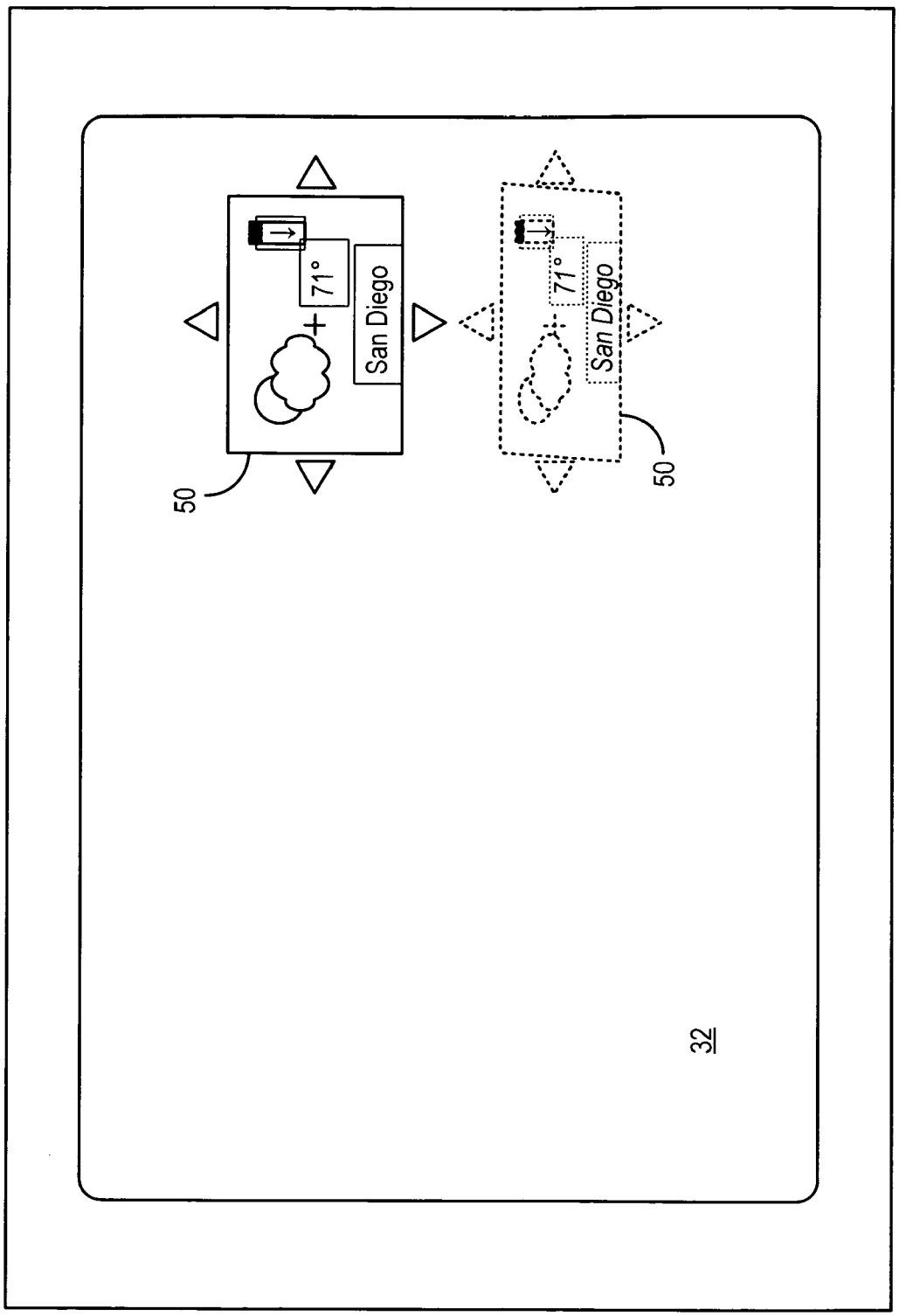
FIG. 8 is an example simulated screen shot depicting free space arrangement of a weather Widget or Snippet that is in the Move Mode and being animated in movement downward in a manner consistent with certain embodiments of the present invention.
Figure 9:
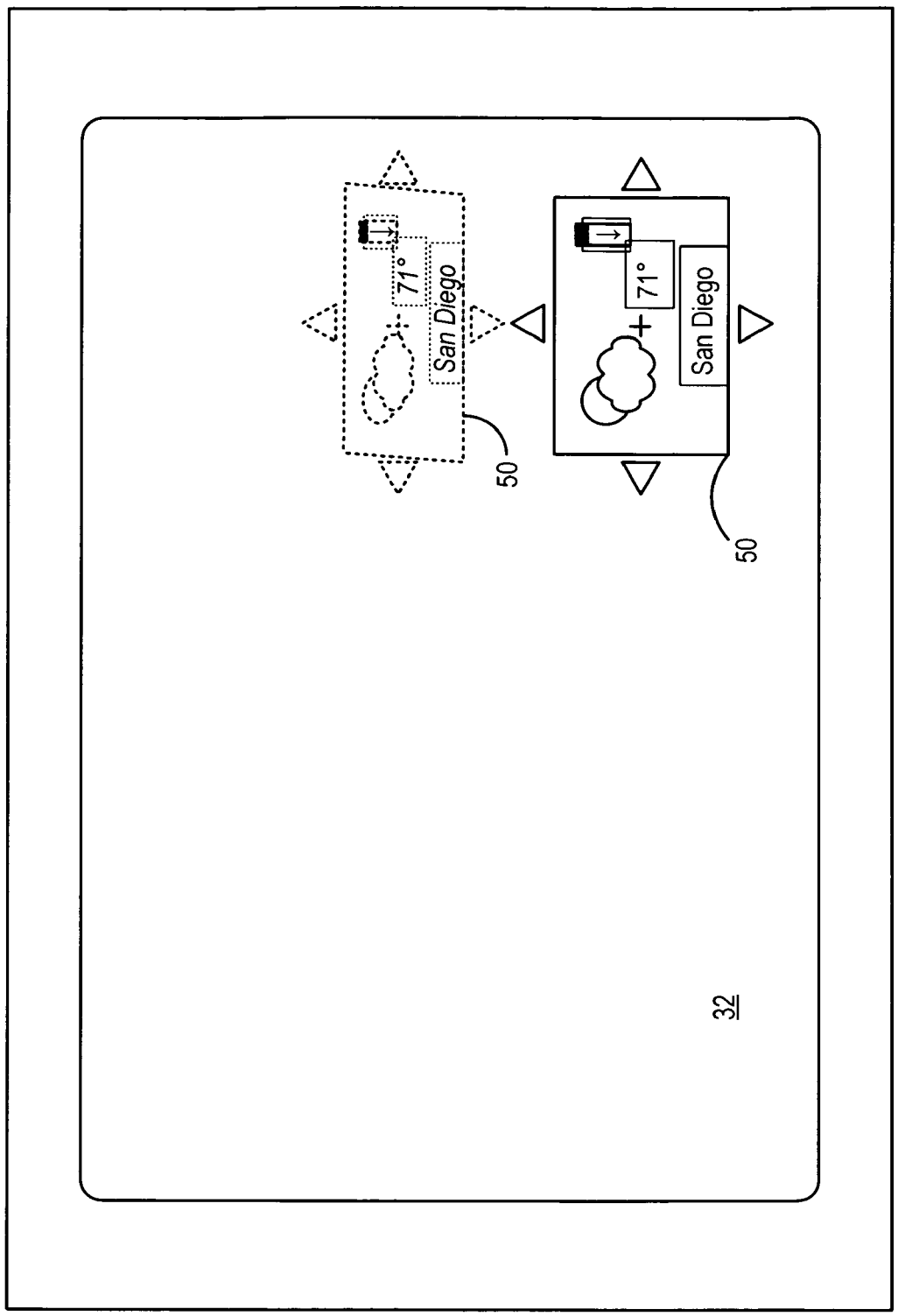
FIG. 9 is an example simulated screen shot depicting free space arrangement of a weather Widget or Snippet that is in the Move Mode and being animated in movement downward in a manner consistent with certain embodiments of the present invention.

FIG. 7 depicts further movement to the right of the screen where Widget 50 comes to rest as depicted by its original appearance (with the moving Widget now depicted in dotted lines). In a similar manner, FIGS. 8-9 depict movement of Widget 50 downward to the lower right corner of the screen 32 and coming to rest there. Again movement is animated with the 3D graphics engine and is depicted in the drawings using dotted lines to indicate prior Widget positions and states of animation.

Figure 10:
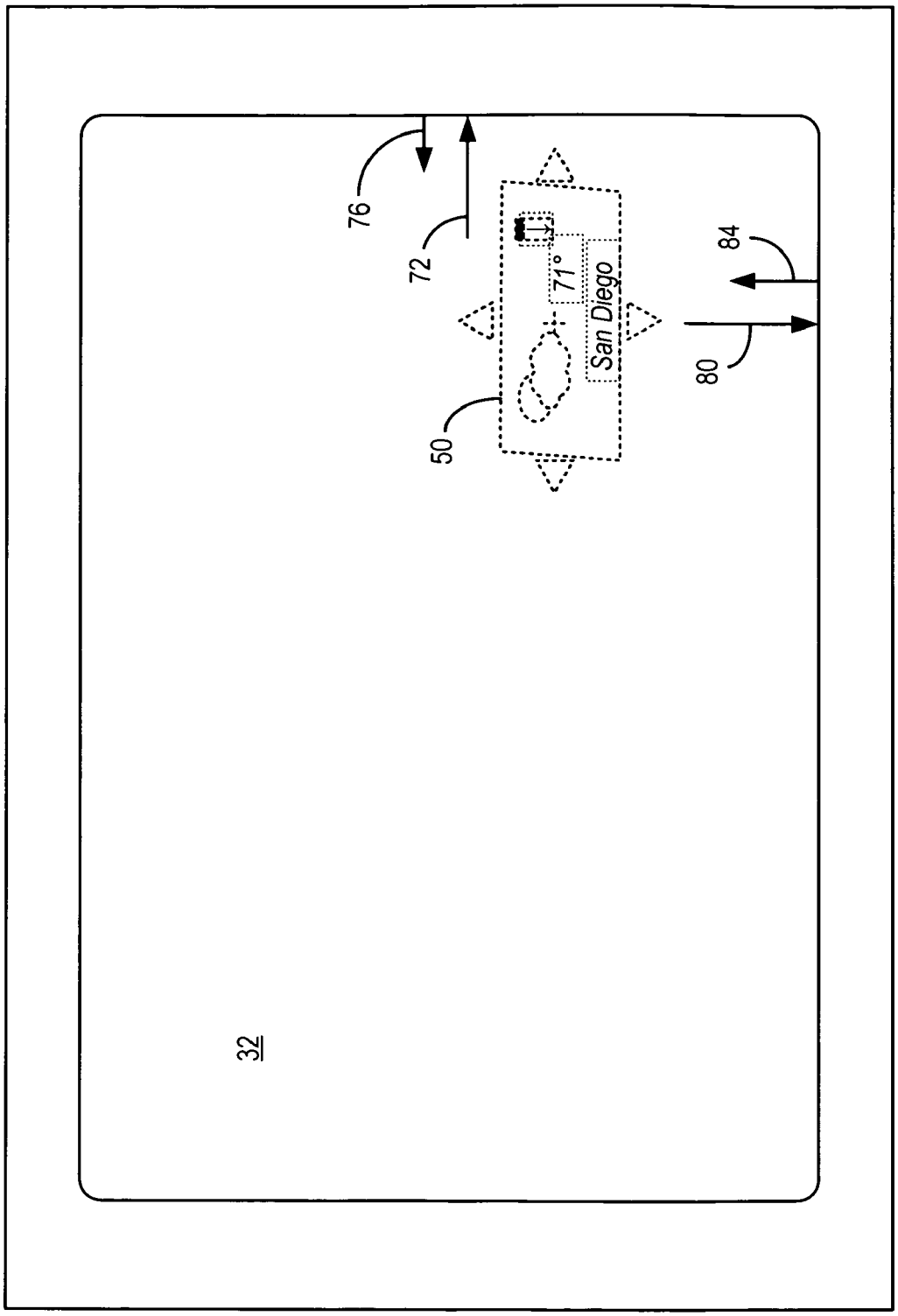
FIG. 10 is an example simulated screen shot depicting free space arrangement of a weather Widget or Snippet that illustrates bouncing at the right or bottom edge of the screen using 3D animated movement in a manner consistent with certain embodiments of the present invention.

In order to make the television Widgets and Snippets more interesting and entertaining to use, various animations can be added to those already discussed. By way of example, as depicted in FIG. 10, Widget 50, if moved either to the right or down as shown (but generally in any direction), can ultimately reach the edge of the screen 32. Consider the case of movement to the right as represented by arrow 72. If the user moves the Widget to the right and encounters the edge of the screen, the Widget can be animated to bounce back to the left slightly away from the edge in the direction of arrow 76. Similarly, if the DOWN arrow is pressed, the Widget can move downward in the direction of arrow 80 until it encounters the edge of the screen 32, and then it bounces back in the direction of arrow 84.

Movement of the Widget in response to the remote controller's command signals can take a number of forms that can contribute to the animation effect. First, the Widget's appearance can be altered as previously discussed in order to render the Widget's screen appearance so as to depict motion in any suitable manner. This can be obtained by reducing the profile of the Widget as displayed in any or all directions, blurring, tilting, page turning (i.e., peeling down from one corner and then reappearing in full) or other animation effects to render a 3D and or movement impression of the Widget as it moves. Such animations can be carried out using commercially available 3D rendering engines such as those available from Broadcom Corporation of Irvine, Calif.

Figure 11:
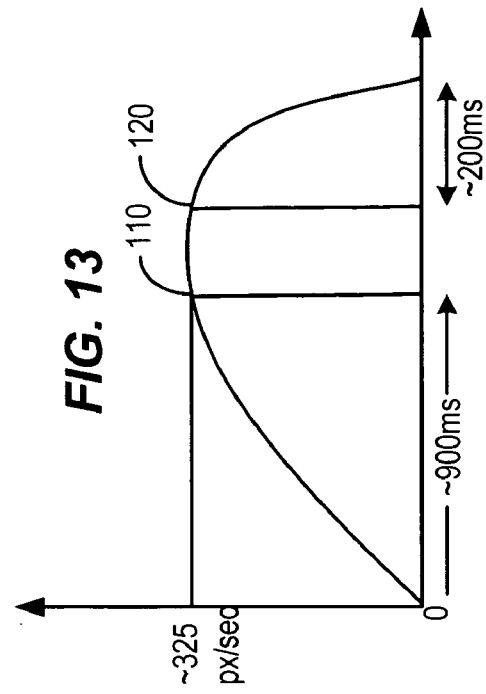
FIG. 11 is graph depicting one illustrative example of movement of a Widget or Snippet in pixels per second versus time upon a single press of a direction key of a remote controller while the Widget or Snippet is in the Move Mode in a manner consistent with certain embodiments of the present invention.
Figure 12:
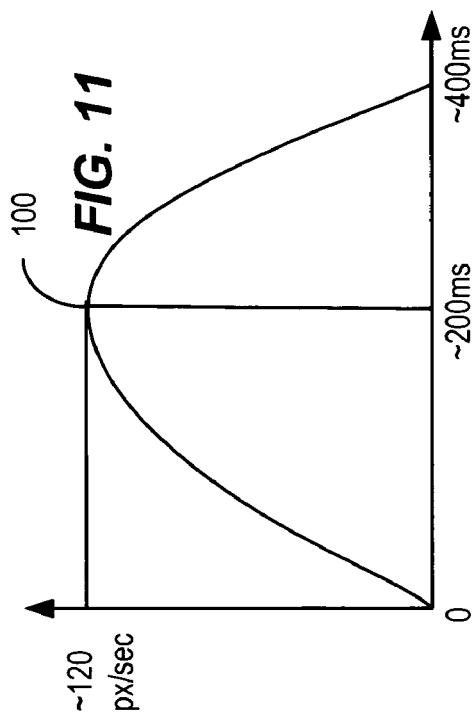
FIG. 12 is graph depicting one illustrative example of animation of a moving Widget or Snippet in terms of angle of skewing versus time upon a single press of a direction key of a remote controller while the Widget or Snippet is in the Move Mode in a manner consistent with certain embodiments of the present invention.

Movement of the Widgets in Move Mode can be carried out either by repeatedly pressing (clicking) the arrow key or by pressing and holding the arrow key. With Reference first to unscaled FIGS. 11-12, one set of movement profiles is depicted for one implementation associated with a single click of the arrow key. In FIG. 11, it is seen that at time 0, when the arrow button is clicked, the movement of the Widget first accelerates to a peak of, in this example, about 120 pixels per second after about 200 ms at point 100, after which the movement decelerates for about another 200 ms until the Widget comes to rest at its new location. The values shown, of course can be varied for a desired effect. In this case, the Widget's acceleration and deceleration are approximately symmetrical. FIG. 12 depicts animation of the Widget by application of a tilt angle that ramps up to approximately 20 degrees over the acceleration period of approximately 200 ms to point 100, followed by a ramping down of the tilt angle for approximately 300 ms which is slightly longer than actual motion of the Widget so as to depict a stopping action.

Figure 13:
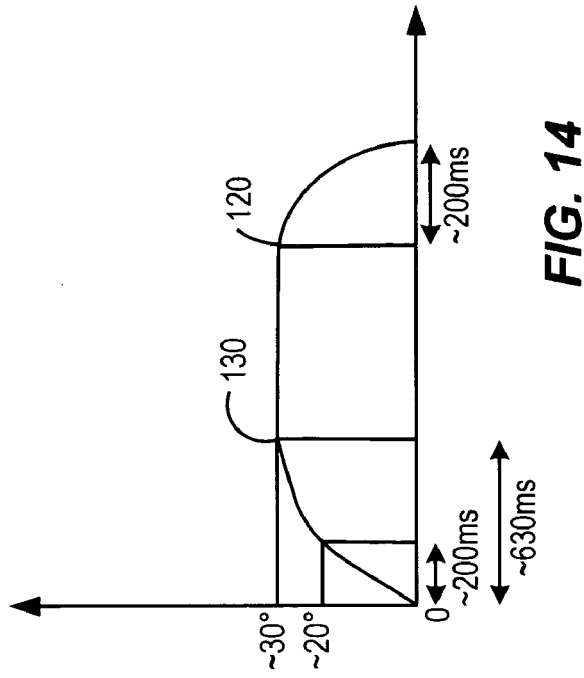
FIG. 13 is graph depicting one illustrative example of movement of a Widget or Snippet in pixels per second versus time upon a press and hold of a direction key of a remote controller while the Widget or Snippet is in the Move Mode in a manner consistent with certain embodiments of the present invention.
Figure 14:
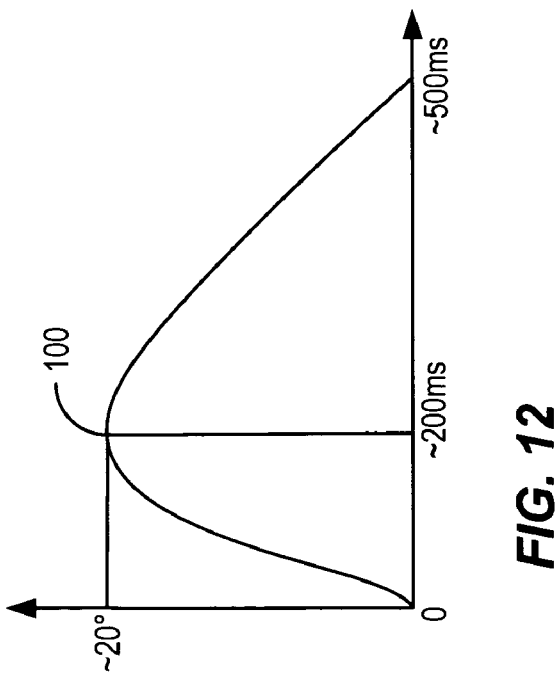
FIG. 14 is graph depicting one illustrative example of animation of a moving Widget or Snippet in terms of angle of skewing versus time upon a press and hold of a direction key of a remote controller while the Widget or Snippet is in the Move Mode in a manner consistent with certain embodiments of the present invention.

When the arrow key is pressed and held, the action in one implementation can follow the unscaled graphs of FIGS. 13-14. In the case where a user presses and holds an arrow key, according the this example implementation, the Widget steadily accelerates for about 900 ms to a terminal velocity of about 325 pixels per second at point 110. This speed is maintained until the key is released at point 120 after which the Widget decelerates for approximately 200 ms and comes to rest. Simultaneously, the Widget is animated with a tilt that ramps up to about 20 degrees over the first 200 ms and further to about 30 degrees at point 130 over approximately the next 430 ms where it remains until the key is released at 120. After 120, the tilt angle ramps down to zero as the Widget comes to rest over the next 200 ms. In this case, the tilt and deceleration terminate at the same time, but this is not to be limiting, since the animation can be adjusted in numerous ways.

Figure 15:
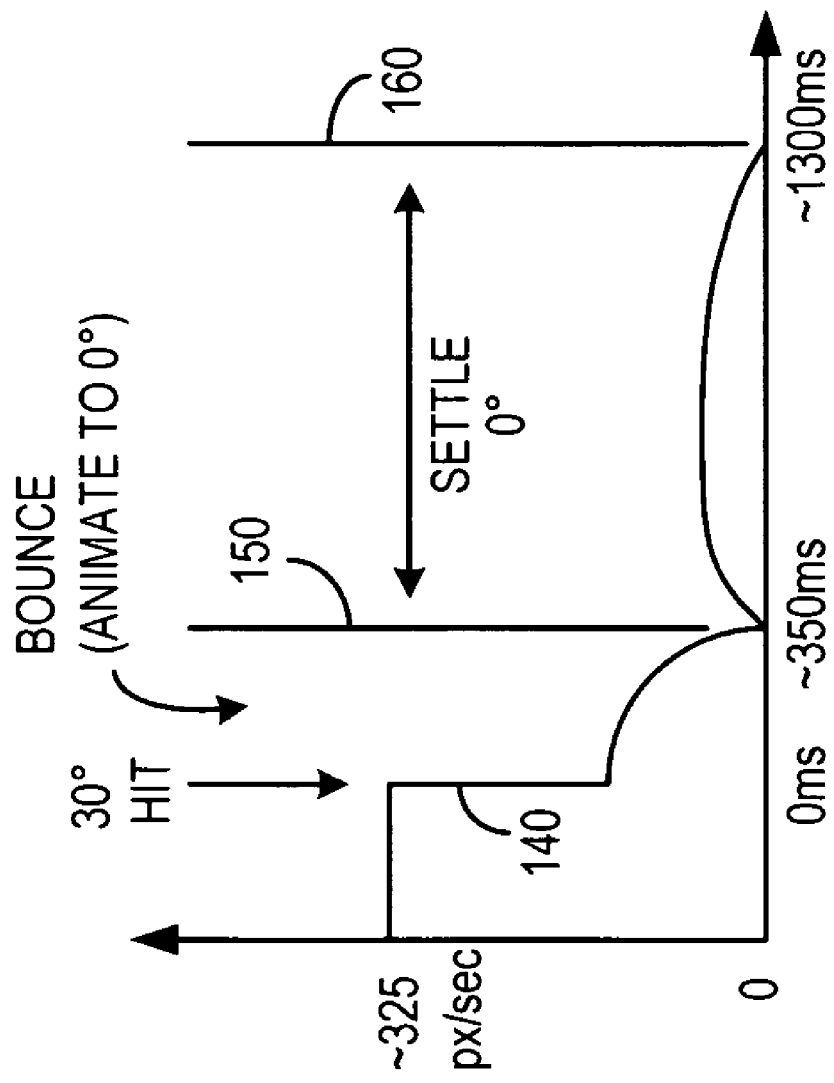
FIG. 15 is graph depicting one illustrative example of animation of a moving Widget or Snippet in terms of bounce movement and animation versus time a Widget or Snippet striking an edge of the display screen while the Widget or Snippet is in the Move Mode in a manner consistent with certain embodiments of the present invention.

FIG. 15 provides an example of the bounce action when a Widget encounters the edge of a screen at full speed (in this example implementation at 325 pixels per second). At 0 ms, the Widget impacts the edge of the screen at 140 with a tilt of 30 degrees. Over the next 350 ms, the bounce is animated with the tilt animated down to 0 degrees over that time. At 350 ms in this example, and at point 150, the Widget rebounds slowly during the settling time with 0 degrees of tilt until 160 which is about 1300 ms from the impact point at 140. Those skilled in the art will appreciate that other times, speeds, tilts and animation actions can also be used without limitation.

Figure 16:
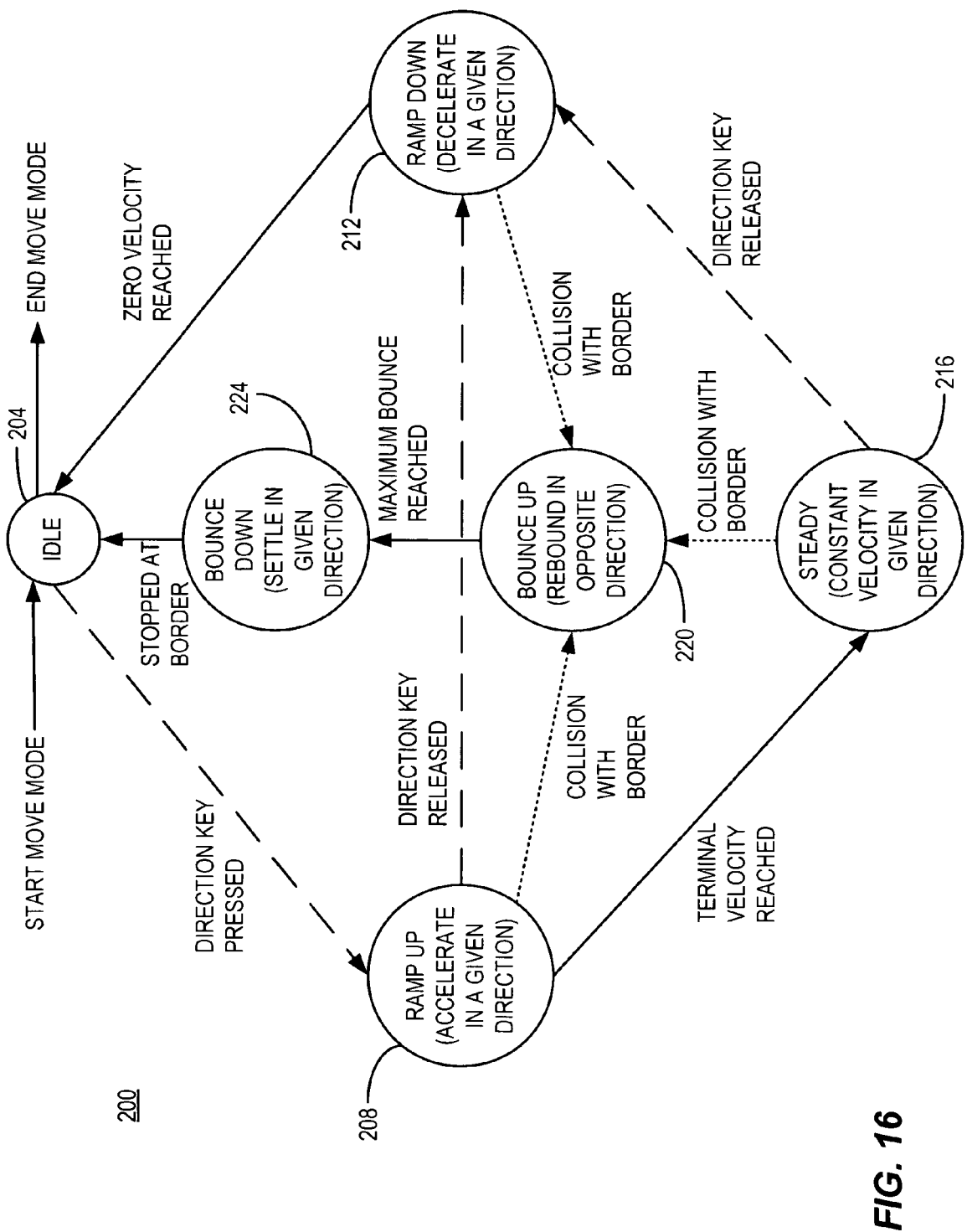
FIG. 16 is an example state diagram depicting the basic movement actions used in animating a Widget or Snippet in a manner consistent with certain embodiments of the invention.

The basic operation of the Widget animation and movement is depicted by the state diagram 200 of FIG. 16. States are depicted as circles, user actions are depicted in dashed lines, screen events are depicted in dotted lines and program events are depicted in solid lines. In this diagram, entering Move Mode places the system in an idle state at 204 wherein the move mode is depicted by the arrows surrounding the Widget. When the user presses a direction arrow key, the state changes to state 208 where movement begins with a ramp up to accelerate in the direction dictated by the arrow key. The ramp up can be determined by a formula, an algorithm, a graph, lookup table or other mechanism. As the Widget is accelerating, it is also being animated using a 3D graphics engine to add movement attributes such as tilt to the Widget.

If the direction key is released, the system enters state 212 where a ramp down in speed and animation effect takes place until zero velocity is reached. At this point, the Widget comes to rest and the system returns to idle state 204.

If the direction key is held long enough to reach terminal velocity at 208, the system transitions to state 216 where a steady velocity is achieved and movement generally continues until the direction key is released causing entry into state 212 as previously described.

At any of states 208, 212 or 216, if the Widget encounters a border and collides with the border, the state changes to state 220 where a bounce is initiated to rebound in the opposite direction of the prior movement of the Widget. When the maximum bounce is reached, the state changes to 224 for the settling period until the Widget comes to rest at the border and the system returns to the idle state 204. The system stays in the idle state 204 until such time as the user toggles the state out of the Move Mode. At this point, in certain embodiments, the Widget in focus upon starting the Move Mode will remain in focus unless the user navigates away from the focused Widget.

Figure 17:
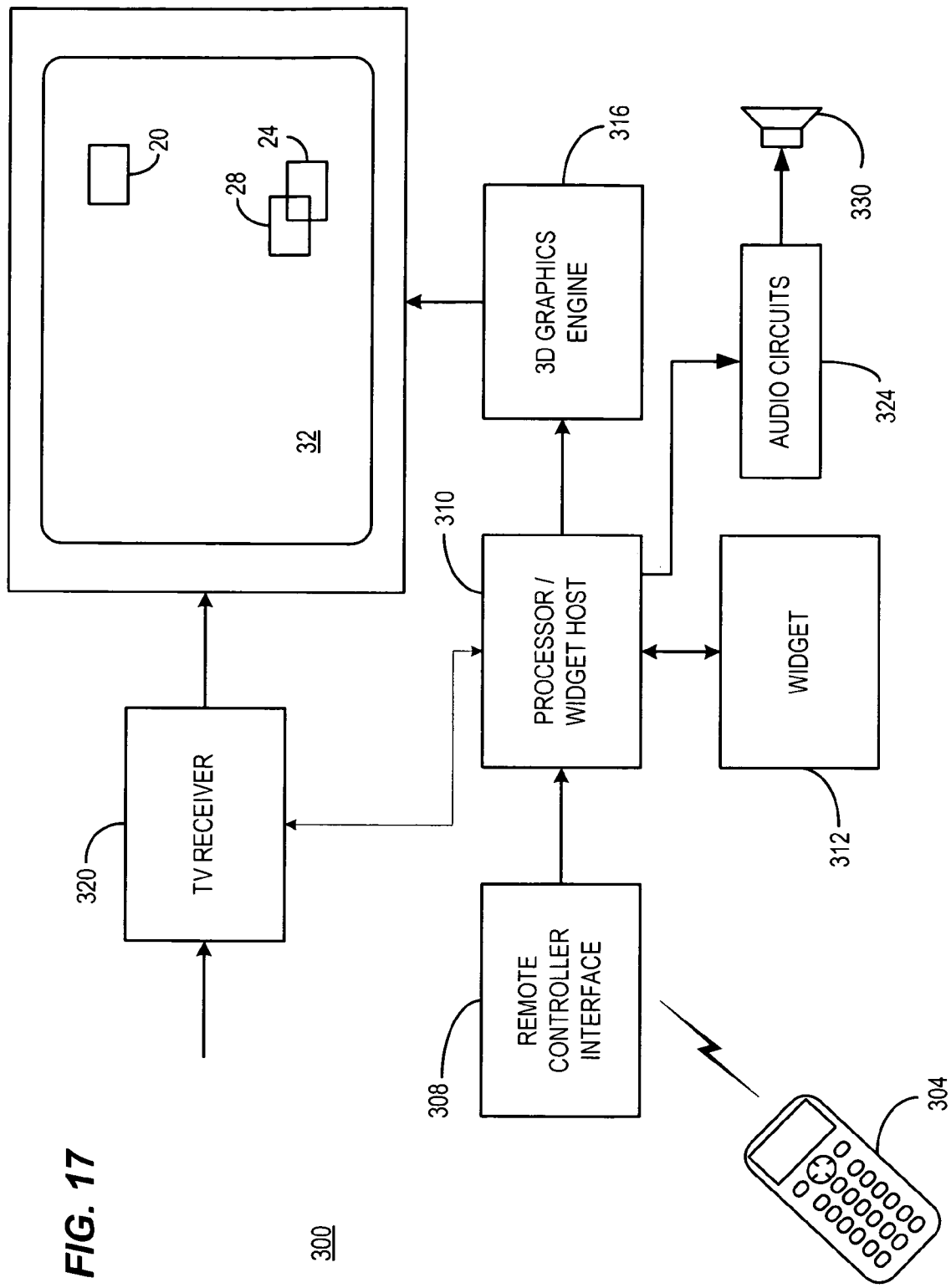
FIG. 17 is an example television receiver device block diagram for hosting Widgets and Snippets that are manipulated in a manner consistent with certain embodiments of the invention.

A system 300 for implementing the Widget actions described herein is depicted in FIG. 17. The user enters commands to enter the Move Mode or to make movement actions via a remote controller 304. Such commands are received by a remote controller interface forming a part of the television receiver device, for example, by infrared or radio frequency commands. Those commands are interpreted and passed to a processor or processors 310 that serve as controllers for the television set as well as a host processor for the Widget depicted as 312. The Widget's appearance as an icon, window, etc. on the display 32 is controlled by a 3D graphics engine 316 that serves to control and animate movements based upon instructions from the processor 310 depending upon the RC commands received at 308. TV signals are received in any suitable manner (via cable, satellite, over the air, or Internet) via TV receiver 320 which also operates under control of processor 310 to provide television program display on display panel or screen 32.

During movement and other animated action of the Widgets, the processor 310 can also generate or retrieve audio that accompanies the animation of the Widget movement. This audio is provided to audio circuits 324 for amplification and the like for reproduction over speakers depicted generally as 330. For example, during a collision with a border as depicted in transitions from states 208 or 212 or 216 to 220, a sound depicting a crash, thud, a springing "boing", a drum sound or other appropriate sound can be generated. Similarly, at 208 as the animation depicts acceleration, an accelerating sound can be depicted as an automotive, footsteps, zipping, whizzing or other acceleration evoking sound can be generated, with an opposite decelerating sound generated at state 212. Similarly, a sound that evokes a bouncing phenomenon can be generated during states 220 and 224, and a sound associated with constant velocity produced at 216. At the idle state, no sound is generally produced, except that a sound may be produced upon entry or exit of the Move Mode to accompany the changing video depiction. Voice sounds or any other accompanying sounds can be made a part of the A/V animation experience in a manner consistent with certain implementations.

Thus, in certain implementations, a television Widget movement method involves providing access to a plurality of Widget programs to a television Widget host processor; receiving a dedicated command from a remote controller that activates the plurality of Widget programs, wherein the Widget programs, when in a Display mode, display Widget representations on a display; receiving a command from the remote controller that establishes one of the plurality of displayed Widget programs as the Widget program that is currently in focus; and receiving a command from the remote controller that places the Widget program that is currently in focus in a Move Mode, wherein the Widget representation can be moved about the display while in Move Mode, wherein when the Widget is in Move Mode, the Widget representation is responsive to UP, DOWN, LEFT and RIGHT navigation commands from the remote controller to move about the display, and wherein such movement is animated using a 3 dimensional graphics engine.

In certain implementations, when in the Move Mode, a single click of a navigation command from the remote controller results in an acceleration followed by a deceleration from a current display position of the Widget representation to a new display position of the Widget representation. In certain implementations, the acceleration and deceleration is accompanied by a 3 dimensional graphics animation of the movement that can be characterized by an increasing and then decreasing animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation. In certain implementations, the acceleration and deceleration is accompanied by a 3 dimensional graphics animation of the movement that can be characterized by an increasing and then decreasing animation angle, and wherein the terminal velocity is represented by the maximum animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display.

Another television Widget movement method involves providing access to a plurality of Widget programs to a television Widget host processor; receiving commands that change an operational mode of the Widget programs, where: in a Hide Mode the Widget programs are not displayed on a display; in a Display Mode the Widget programs are displayed on the display, wherein navigation commands from the remote controller operate to change focus from one Widget representation on the display to another; in a Move Mode a representation of the Widget program that is currently in focus is responsive to navigation commands from the remote controller to move the Widget about the display; when the Widget is in Move Mode, the Widget representation is responsive to UP, DOWN, LEFT and RIGHT navigation commands from the remote controller to move about the display, and wherein such movement is animated using a 3 dimensional graphics engine.

In certain implementations, when in the Move Mode, a single click of a navigation command from the remote controller results in an acceleration followed by a deceleration from a current display position of the Widget representation to a new display position of the Widget representation. In certain implementations, the acceleration and deceleration is accompanied by a 3 dimensional graphics animation of the movement that can be characterized by an increasing and then decreasing animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation. In certain implementations, the acceleration and deceleration is accompanied by a 3 dimensional graphics animation of the movement that can be characterized by an increasing and then decreasing animation angle, and wherein the terminal velocity is represented by the maximum animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display.

Another television Widget movement method involves providing access to a plurality of Widget programs to a television Widget host processor; receiving commands that change an operational mode of the Widget programs, where: in a Hide Mode the Widget programs are not displayed on a display; in a Display Mode the Widget programs are displayed on the display, wherein navigation commands from the remote controller operate to change focus from one Widget representation on the display to another; in a Move Mode a representation of the Widget program that is currently in focus is responsive to navigation commands from the remote controller to move the Widget about the display; and in the Display Mode, the display can be arranged either as a Free Form display wherein Widget representations can be placed anywhere on the display overlaying television content, a docket arrangement wherein Widget representations are situated in a predefined segment of the display overlaying television content, or in a split screen docked arrangement wherein the Widget representations occupy a split segment of the display with the television content occupying a remaining portion of the display; and wherein when the Widget is in Move Mode, the Widget representation is responsive to UP, DOWN, LEFT and RIGHT navigation commands from the remote controller to move about the display, and wherein such movement is animated using a 3 dimensional graphics engine, and wherein when in the Move Mode, a single click of a navigation command from the remote controller results in an acceleration followed by a deceleration from a current display position of the Widget representation to a new display position of the Widget representation, and wherein the acceleration and deceleration is accompanied by a 3 dimensional graphics animation of the movement that can be characterized by an increasing and then decreasing animation angle.

In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, and wherein the acceleration and deceleration is accompanied by a 3 dimensional graphics animation of the movement that can be characterized by an increasing and then decreasing animation angle, and wherein the terminal velocity is represented by the maximum animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display.

A tangible computer readable electronic storage medium can store instructions which, when executed on one or more programmed processors, carry out any method described herein.

A television Widget movement method consistent with certain implementations involves providing access to a plurality of Widget programs to a television Widget host processor; receiving a dedicated command from a remote controller that activates the plurality of Widget programs, wherein the Widget programs, when in a Display mode, display Widget representations on a display; receiving a command from the remote controller that establishes one of the plurality of displayed Widget programs as the Widget program that is currently in focus; and receiving a command from the remote controller that places the Widget program that is currently in focus in a Move Mode, wherein the Widget representation can be moved about the display while in Move Mode.

In certain implementations, when the Widget is in Move Mode, the Widget representation is responsive to UP, DOWN, LEFT and RIGHT navigation commands from the remote controller to move about the display. In certain implementations, responsive to receiving a command from the remote controller, the Widget program that is in Move Mode exits the Move mode and remains in focus. In certain implementations, in the Display Mode, the display can be arranged either as a Free Form display wherein Widget representations can be placed anywhere on the display overlaying television content, a docket arrangement wherein Widget representations are situated in a predefined segment of the display overlaying television content, or in a split screen docked arrangement wherein the Widget representations occupy a split segment of the display with the television content occupying a remaining portion of the display.

Another television Widget movement method involves providing access to a plurality of Widget programs to a television Widget host processor; receiving commands that change an operational mode of the Widget programs, where: in a Hide Mode the Widget programs are not displayed on a display; in a Display Mode the Widget programs are displayed on the display, wherein navigation commands from the remote controller operate to change focus from one Widget representation on the display to another; and in a Move Mode a representation of the Widget program that is currently in focus is responsive to navigation commands from the remote controller to move the Widget about the display.

In certain implementations, when the Widget is in Move Mode, the Widget representation is responsive to UP, DOWN, LEFT and RIGHT navigation commands from the remote controller to move about the display. In certain implementations, responsive to receiving a command from the remote controller, the Widget program that is in Move Mode exits the Move mode and remains in focus in the Display Mode. In certain implementations, the Widget program representations are arranged in a Free Space organization that allows the Widgets to be placed anywhere within the visible screen area. In certain implementations, navigation from Widget representation to another depends on the relative location of the Widget representation to a center line of the Widget representation in focus In certain implementations, if all of the plurality of Widget representations are in center to center alignment then movement between Widget representations in the Display Mode only occurs when navigation keys corresponding to the alignment of the Widget representations are activated. In certain implementations, when the Widget representations are in an offset alignment vertically and horizontally, either a vertical or horizontal navigation key can be used to navigate among Widget representations. In certain implementations, ambiguous navigation is resolved to a Widget representation item that is closest to the Widget representation in focus. In certain implementations, ambiguous navigation is resolved to a Widget representation that is next in accord with an established rule. In certain implementations, in the Display Mode, the display can be arranged either as a Free Form display wherein Widget representations can be placed anywhere on the display overlaying television content, a docket arrangement wherein Widget representations are situated in a predefined segment of the display overlaying television content, or in a split screen docked arrangement wherein the Widget representations occupy a split segment of the display with the television content occupying a remaining portion of the display.

Another television Widget movement method involves providing access to a plurality of Widget programs to a television Widget host processor; receiving commands that change an operational mode of the Widget programs, where: in a Hide Mode the Widget programs are not displayed on a display; in a Display Mode the Widget programs are displayed on the display, wherein navigation commands from the remote controller operate to change focus from one Widget representation on the display to another; in a Move Mode a representation of the Widget program that is currently in focus is responsive to navigation commands from the remote controller to move the Widget about the display; and where in the Display Mode, the display can be arranged either as a Free Form display wherein Widget representations can be placed anywhere on the display overlaying television content, a docket arrangement wherein Widget representations are situated in a predefined segment of the display overlaying television content, or in a split screen docked arrangement wherein the Widget representations occupy a split segment of the display with the television content occupying a remaining portion of the display.

In certain implementations, when the Widget is in Move Mode, the Widget representation is responsive to UP, DOWN, LEFT and RIGHT navigation commands from the remote controller to move about the display. In certain implementations, responsive to receiving a command from the remote controller, the Widget program that is in Move Mode exits the Move mode and remains in focus in the Display Mode.

Another television Widget movement method involves providing access to a plurality of Widget programs to a television Widget host processor; receiving a dedicated command from a remote controller that activates the plurality of Widget programs, wherein the Widget programs, when in a Display mode, display Widget representations on a display; receiving a command from the remote controller that establishes one of the plurality of displayed Widget programs as the Widget program that is currently in focus; and receiving a command from the remote controller that places the Widget program that is currently in focus in a Move Mode, wherein the Widget representation can be moved about the display while in Move Mode, wherein when the Widget is in Move Mode, the Widget representation is responsive to UP, DOWN, LEFT and RIGHT navigation commands from the remote controller to move about the display, and wherein such movement is animated using a 3 dimensional graphics engine, and wherein such animated movement is accompanied by an audio sound effect.

In certain implementations, when in the Move Mode, a single click of a navigation command from the remote controller results in an acceleration followed by a deceleration from a current display position of the Widget representation to a new display position of the Widget representation, and wherein such acceleration and deceleration are accompanied by audio sound effects. In certain implementations, the acceleration and deceleration is accompanied by a 3 dimensional graphics animation of the movement that can be characterized by an increasing and then decreasing animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, and wherein such acceleration, terminal velocity and deceleration are accompanied by audio sound effects. In certain implementations, the acceleration and deceleration are accompanied by a 3 dimensional graphics animation of the movement that can be characterized by an increasing and then decreasing animation angle, and wherein the terminal velocity is represented by the maximum animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display, and wherein such acceleration, terminal velocity, deceleration and bounce are accompanied by audio sound effects.

Another television Widget movement method involves providing access to a plurality of Widget programs to a television Widget host processor; receiving commands that change an operational mode of the Widget programs, where: in a Hide Mode the Widget programs are not displayed on a display; in a Display Mode the Widget programs are displayed on the display, wherein navigation commands from the remote controller operate to change focus from one Widget representation on the display to another; in a Move Mode a representation of the Widget program that is currently in focus is responsive to navigation commands from the remote controller to move the Widget about the display; wherein when the Widget is in Move Mode, the Widget representation is responsive to UP, DOWN, LEFT and RIGHT navigation commands from the remote controller to move about the display, and wherein such movement is animated using a 3 dimensional graphics engine, and wherein such animation is accompanied by an audio sound effect.

In certain implementations, when in the Move Mode, a single click of a navigation command from the remote controller results in an acceleration followed by a deceleration from a current display position of the Widget representation to a new display position of the Widget representation, and wherein such acceleration and deceleration are accompanied by audio sound effects. In certain implementations, the acceleration and deceleration is accompanied by a 3 dimensional graphics animation of the movement that can be characterized by an increasing and then decreasing animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, and wherein such acceleration, terminal velocity and deceleration are accompanied by audio sound effects. In certain implementations, the acceleration and deceleration is accompanied by a 3 dimensional graphics animation of the movement that can be characterized by an increasing and then decreasing animation angle, and wherein the terminal velocity is represented by the maximum animation angle. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display, and wherein such acceleration, terminal velocity, deceleration and bounce are accompanied by an audio sound effect.

Another television Widget movement method involves providing access to a plurality of Widget programs to a television Widget host processor; receiving commands that change an operational mode of the Widget programs, where: in a Hide Mode the Widget programs are not displayed on a display; in a Display Mode the Widget programs are displayed on the display, wherein navigation commands from the remote controller operate to change focus from one Widget representation on the display to another; in a Move Mode a representation of the Widget program that is currently in focus is responsive to navigation commands from the remote controller to move the Widget about the display; and where in the Display Mode, the display can be arranged either as a Free Form display wherein Widget representations can be placed anywhere on the display overlaying television content, a dock arrangement wherein Widget representations are situated in a predefined segment of the display overlaying television content, or in a split screen docked arrangement wherein the Widget representations occupy a split segment of the display with the television content occupying a remaining portion of the display; and wherein when the Widget is in Move Mode, the Widget representation is responsive to UP, DOWN, LEFT and RIGHT navigation commands from the remote controller to move about the display, and wherein such movement is animated using a 3 dimensional graphics engine, and wherein when in the Move Mode, a single click of a navigation command from the remote controller results in an acceleration followed by a deceleration from a current display position of the Widget representation to a new display position of the Widget representation, and wherein the acceleration and deceleration is accompanied by a 3 dimensional graphics animation of the movement that can be characterized by an increasing and then decreasing animation angle, and wherein such acceleration and deceleration are accompanied by audio sound effects.

In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, and wherein the acceleration and deceleration is accompanied by a 3 dimensional graphics animation of the movement that can be characterized by an increasing and then decreasing animation angle, and wherein the terminal velocity is represented by the maximum animation angle, and wherein such acceleration, terminal velocity and deceleration are accompanied by audio sound effects. In certain implementations, when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display, and wherein such acceleration, terminal velocity, deceleration and bounce are accompanied by an audio sound effect.

A tangible computer readable electronic storage medium storing instructions which, when executed on one or more programmed processors, can carry out any of the methods disclosed herein.

Those skilled in the art will recognize, upon consideration of the above teachings, that certain of the above exemplary embodiments are based upon use of a programmed processor running program modules or on a state machine. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments. Electronic storage media can store instructions used by processors to carry out the process steps described.

While certain illustrative embodiments have been described, it is evident that many alternatives, modifications, permutations and variations will become apparent to those skilled in the art in light of the foregoing description.

What is claimed is:

1. A television Widget movement method, comprising:
providing access to a plurality of Widget programs to a television Widget host processor;
receiving a dedicated command from a remote controller that activates the plurality of Widget programs, wherein the Widget programs, when in a Display mode, display Widget representations on a display;
receiving a command from the remote controller that establishes one of the plurality of displayed Widget programs as the Widget program that is currently in focus;
receiving a command from the remote controller that places the Widget program that is currently in focus in a Move Mode, wherein the Widget representation can be moved about the display while in Move Mode, where when the television Widget program is in Move Mode, the Widget representation is responsive to UP, DOWN, LEFT and RIGHT navigation commands from the remote controller to move about the display, and wherein such movement is animated using a 3 dimensional graphics engine, and wherein such animated movement is accompanied by an audio sound effect; and
where when in the Move Mode, a press and hold of a navigation command from the remote controller results in an acceleration up to a terminal velocity followed by a deceleration upon release of the navigation command to travel from a current display position of the Widget representation to a new display position of the Widget representation, and where such acceleration, terminal velocity and deceleration are accompanied by audio sound effects.

2. The method according to claim 1, where when in the Move Mode, a single click of a navigation command from the remote controller results in an acceleration followed by a deceleration from a current display position of the Widget representation to a new display position of the Widget representation.

3. The method according to claim 2, where the acceleration and deceleration is accompanied by a 3 dimensional graphics animation of the movement that can be characterized by an increasing and then decreasing animation angle.

4. The method according to claim 1, where the acceleration and deceleration are accompanied by a 3 dimensional graphics animation of the movement that can be characterized by an increasing and then decreasing animation angle, and wherein the terminal velocity is represented by the maximum animation angle.

5. The method according to claim 1, where when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display, and wherein such bounce is accompanied by audio sound effects.

6. A tangible computer readable electronic storage medium storing instructions which, when executed on one or more programmed processors, carry out a method according to claim 1.

7. A television Widget movement method, comprising:
providing access to a plurality of Widget programs to a television Widget host processor;
receiving commands that change an operational mode of the Widget programs, wherein:
in a Hide Mode the Widget programs are not displayed on a display;
in a Display Mode the Widget programs are displayed on the display, wherein navigation commands from a remote controller operate to change focus from one Widget representation on the display to another;
in a Move Mode a representation of the Widget program that is currently in focus is responsive to navigation commands from the remote controller to move the Widget program representation about the display;
wherein when the Widget program is in Move Mode, the Widget representation is responsive to UP, DOWN, LEFT and RIGHT navigation commands from the remote controller to move about the display, and where such movement is animated using a 3 dimensional graphics engine, and wherein such animation is accompanied by an audio sound effect; and
where when in the Move Mode, a press and hold of a navigation command from the remote controller results in an acceleration up to a terminal velocity followed by a deceleration upon release of the navigation command to travel from a current display position of the Widget representation to a new display position of the Widget representation, and where such acceleration, terminal velocity and deceleration are accompanied by audio sound effects.

8. The method according to claim 7, where when in the Move Mode, a single click of a navigation command from the remote controller results in an acceleration followed by a deceleration from a current display position of the Widget representation to a new display position of the Widget representation.

9. The method according to claim 8, where the acceleration and deceleration is accompanied by a 3 dimensional graphics animation of the movement that can be characterized by an increasing and then decreasing animation angle.

10. The method according to claim 7, where the acceleration and deceleration is accompanied by a 3 dimensional graphics animation of the movement that can be characterized by an increasing and then decreasing animation angle, and wherein the terminal velocity is represented by the maximum animation angle.

11. The method according to claim 7, where when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display, and wherein such bounce is accompanied by an audio sound effect.

12. A tangible computer readable electronic storage medium storing instructions which, when executed on one or more programmed processors, carry out a method according to claim 7.

13. A television Widget movement method, comprising:
providing access to a plurality of Widget programs to a television Widget host processor;
receiving commands that change an operational mode of the Widget programs, wherein:
in a Hide Mode the Widget programs are not displayed on a display;
in a Display Mode the Widget programs are displayed on the display, wherein navigation commands from A remote controller operate to change to change focus from one Widget representation on the display to another;
in a Move Mode a representation of the Widget program that is currently in focus is responsive to navigation commands from the remote controller to move the Widget representation about the display; and
wherein in the Display Mode, the display can be arranged either as a Free Form display wherein Widget representations can be placed anywhere on the display overlaying television content, a dock arrangement where Widget representations are situated in a predefined segment of the display overlaying television content, or in a split screen docked arrangement wherein the Widget representations occupy a split segment of the display with the television content occupying a remaining portion of the display;

where when the Widget program is in Move Mode, the Widget representation is responsive to UP, DOWN, LEFT and RIGHT navigation commands from the remote controller to move about the display, and wherein such movement is animated using a 3 dimensional graphics engine, and wherein when in the Move Mode, a single click of a the navigation command from the remote controller results in an acceleration followed by a deceleration from a current display position of the Widget representation to a new display position of the Widget representation, and where the acceleration and deceleration is accompanied by a 3 dimensional graphics animation of the movement that can be characterized by an increasing and then decreasing animation angle; and where when in the Move Mode, a press and hold of the navigation command from the remote controller results in the acceleration up to a terminal velocity followed by the deceleration upon release of the navigation command to travel from the current display position of the Widget representation to the new display position of the Widget representation, and wherein the acceleration and deceleration is accompanied by a 3 dimensional graphics animation of the movement that can be characterized by the increasing and then decreasing animation angle, and wherein the terminal velocity is represented by the maximum animation angle, and wherein such acceleration, terminal velocity and deceleration are accompanied by audio sound effects.

14. The method according to claim 13, where when in the Move Mode, a press and hold of a navigation command from the remote controller results in an acceleration up to a terminal velocity followed by a deceleration upon release of the navigation to travel from a current display position of the Widget representation to a new display position of the Widget representation, unless a screen edge is encountered prior to cessation of movement of the Widget representation in which case the Widget representation is animated to bounce at the edge of the display, and wherein such bounce is accompanied by an audio sound effect.

15. A tangible computer readable electronic storage medium storing instructions which, when executed on one or more programmed processors, carry out a method according to claim 13.

* * * * *